United States Patent
Ozaki (10) Patent No.: US 7,251,952 B2
(45) Date of Patent: Aug. 7, 2007

(54) AIR CHILLER UNIT

(75) Inventor: Masaji Ozaki, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 10/973,406

(22) Filed: Oct. 27, 2004

(65) Prior Publication Data

US 2005/0092016 A1    May 5, 2005

(30) Foreign Application Priority Data

Oct. 29, 2003  (JP) ............................. 2003-368298

(51) Int. Cl.
*F25D 17/06* (2006.01)
*F25D 17/04* (2006.01)
*F25B 39/04* (2006.01)
*F25B 15/00* (2006.01)

(52) U.S. Cl. ............................. 62/419; 62/476; 62/483; 62/507; 62/508; 62/404; 62/414

(58) Field of Classification Search ............. 62/419, 62/413, 298, 326; 415/203, 204, 206, 119
See application file for complete search history.

(56) References Cited

U.S. PATENT DOCUMENTS

| | | | | |
|---|---|---|---|---|
| 3,115,757 A | * | 12/1963 | Day ............................. | 62/507 |
| 3,977,467 A | * | 8/1976 | Northrup, Jr. ................ | 165/65 |
| 4,013,432 A | * | 3/1977 | Finger .......................... | 55/467 |
| 4,261,255 A | * | 4/1981 | Anderson et al. ........... | 454/354 |
| 4,361,014 A | | 11/1982 | Blain et al. | |
| 5,284,027 A | * | 2/1994 | Martin, Sr. ................... | 62/291 |
| 5,377,503 A | | 1/1995 | Reedy et al. | |
| 5,444,990 A | * | 8/1995 | McGill et al. ................ | 62/298 |
| 5,601,410 A | * | 2/1997 | Quinlan .................. | 416/241 A |
| 6,101,829 A | * | 8/2000 | Robinson ................... | 62/259.1 |

FOREIGN PATENT DOCUMENTS

JP    54-036606 A    3/1979
JP    07-224796 A    8/1995

OTHER PUBLICATIONS

European Search Report, dated Sep. 11, 2006, issued in corresponding European Application No. 04 02 5445.

* cited by examiner

*Primary Examiner*—Cheryl Tyler
*Assistant Examiner*—Michael J. Early
(74) *Attorney, Agent, or Firm*—Westerman, Hattori, Daniels & Adrian, LLP.

(57) ABSTRACT

The invention provides an improved air chiller unit mounted on an aircraft for sending cooled air to service carts for serving meals. An air chiller unit is equipped with a refrigeration cycle unit disposed on a casing. The refrigeration cycle unit is equipped with a compressor, a condenser, an evaporator and so on for a refrigerant, and the cooled air is sent via a blower device 60 to a galley etc. A housing 630 of the blower device 60 has an inlet and two outlets 650, 652 for cooled air. A duct member is inserted to one of the two outlets 650 and 652, and the other outlet is sealed. The casing 10 is formed of a honeycomb panel. Since the honeycomb panel has high flexural rigidity, the base plate can support the refrigeration cycle unit by itself. Further, since the panel has superior heat insulating property, the air cooling efficiency can be improved.

1 Claim, 13 Drawing Sheets

AIR CHILLER UNIT

The present application is based on and claims priority of Japanese patent application No. 2003-368298 filed on Oct. 29, 2003, the entire contents of which are hereby incorporated by reference.

FIELD OF THE INVENTION

The present invention relates to an air chiller unit (air cooling device) equipped within a body of an aircraft, for supplying cooled air to foods or the like.

DESCRIPTION OF THE RELATED ART

Passenger aircrafts that travel long distances, such as international flights, are equipped with service carts storing meals etc. to be served to passengers, and galleys (kitchen areas) storing the service carts for preparing beverages and doing easy food preparation.

The meals are cooked in advance in service facilities on the ground, placed on trays to be stored in service carts, and brought on board.

Of the meals placed on the trays, warm dishes are heated by a heater etc., and the cold dishes such as salads are maintained at low temperature by feeding cooled air into the service carts.

An air chiller unit is disposed in a space in the ceiling or under the floor of the galley of the air craft. The air chiller unit is equipped with a refrigeration cycle unit for cooing air via an evaporator disposed within a cooling air chamber and supplying the cooled air via a duct to the galley or the like.

Since the air chiller unit is disposed in the aircraft, it must be small and light weight. Further, since the air chiller unit is disposed near the passenger seats, noise caused by the air chiller unit must be reduced.

SUMMARY OF THE INVENTION

The object of the present invention is to provide an air chiller unit that satisfies the above-mentioned requirements.

An air chiller unit mounted on an aircraft for supplying cooled air to a storage portion storing foods or the like according to the present invention comprises a refrigeration cycle unit, a casing for storing the refrigeration cycle unit, and a blower device for blowing the cooled air. Further, a housing for the blower device is equipped with an air inlet and first and second air outlets, and further equipped with a duct member inserted selectively to the first and second air outlets.

Further, a rotation axis of an impeller disposed inside the air inlet is tilted with respect to the housing body.

Moreover, a velvety layer (noise reduction layer) is provided on a surface of an impeller blade of the impeller in order to cut down noise.

As described, the present air chiller unit effectively reduces noise such as wind noise by improving the housing design of the blower device for blowing the air cooled by the refrigeration cycle unit toward the galley or the like. It was confirmed by experiment that the present invention realized a maximum of 20 dB noise reduction compared to the prior art device.

DETAILED DESCRIPTION OF THE PREFERRED EMBODIMENTS

Figure 1:
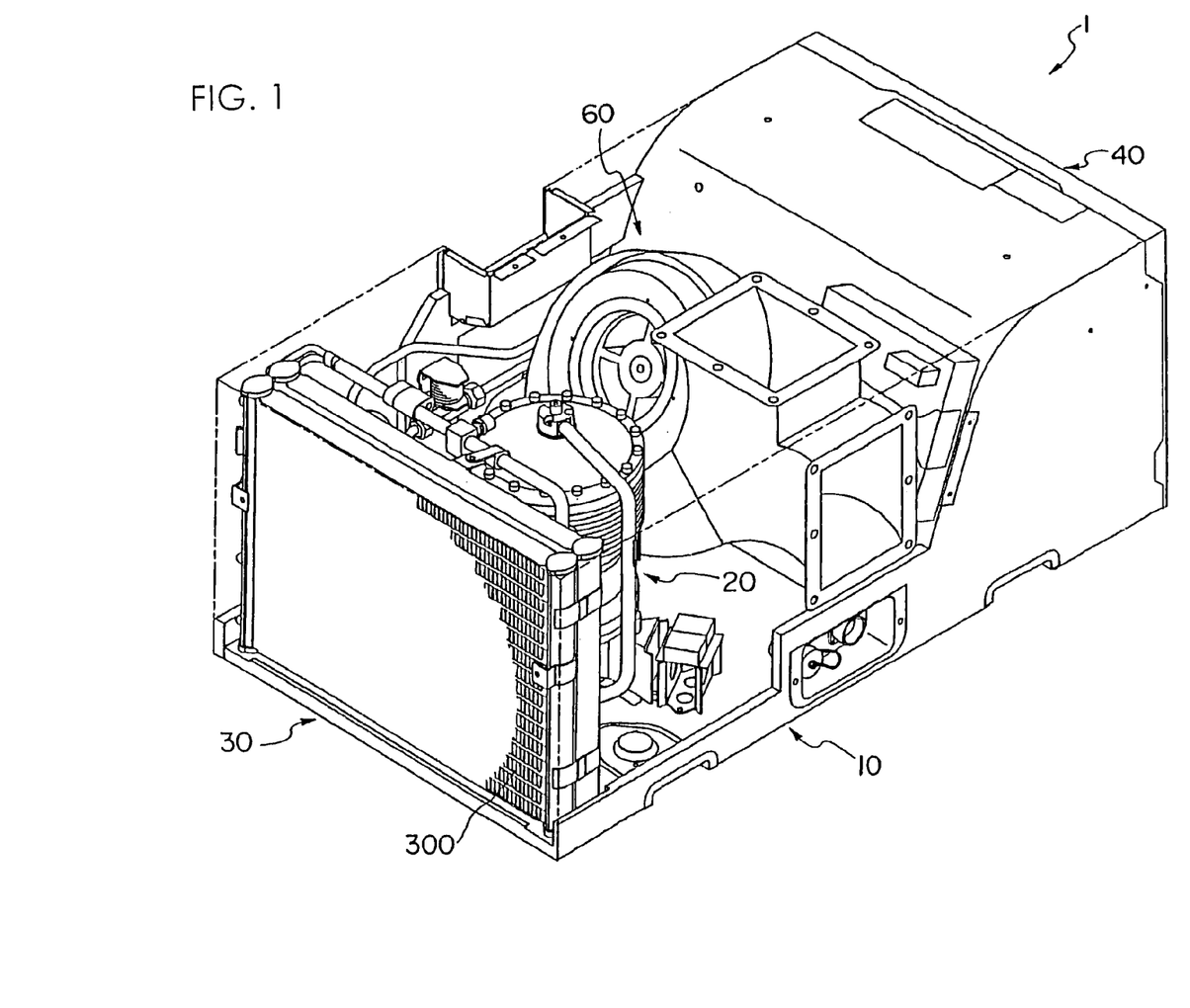
FIG. 1 is an explanatory view of an air chiller unit according to the present invention.
Figure 2:
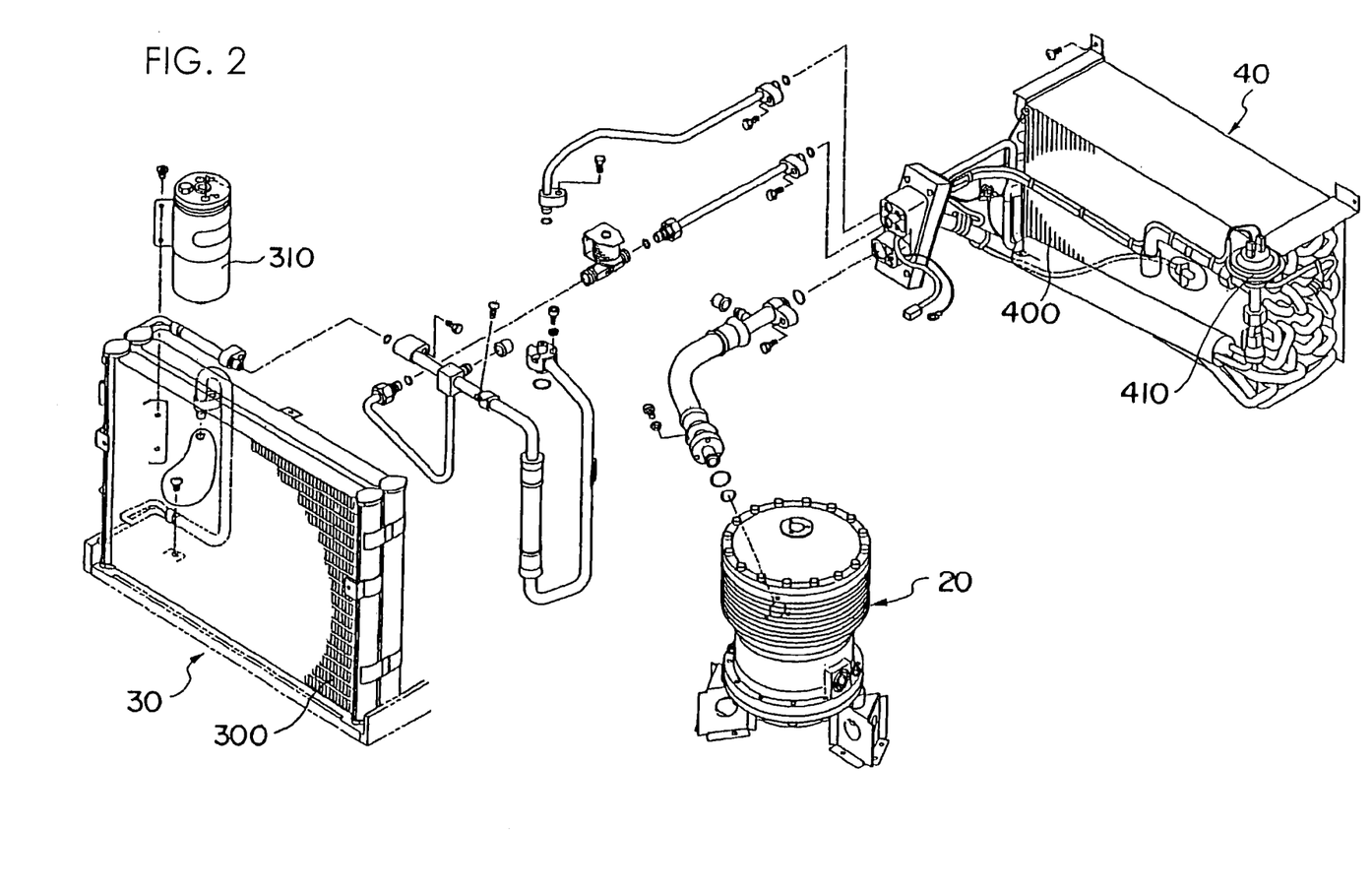
FIG. 2 is an explanatory view of a refrigeration cycle unit of the air chiller unit according to the present invention.

FIGS. 1 and 2 are explanatory views showing the exterior of the air chiller unit according to the present invention and the general structure of the refrigeration cycle unit.

An air chiller unit referred to as a whole by reference number 1 is equipped with a casing 10, a compressor 20 for a refrigerant disposed within the casing 10, a condenser 30, an evaporator 40 and a blower device 60 for blowing air.

As illustrated in FIG. 2, the refrigeration cycle unit of the air chiller unit is equipped with a compressor 20 driven by a motor, for compressing the refrigerant and sending out the same toward the condenser 30. The condenser 30 is equipped with a heat exchanger 300 for exchanging the gaseous refrigerant to a liquid-phase refrigerant. The liquid-phase refrigerant is stored in a receiver drier 310 disposed adjacent to the heat exchanger. The liquid-phase refrigerant of the receiver drier 310 is sent via a piping to an evaporator 40 disposed within the air cooling chamber defined by the wall of the casing 10. The liquid-phase refrigerant travels through an expansion valve 410 equipped to the evaporator 40 and sent to a heat exchanger 400 of the evaporator. The refrigerant is then evaporated in the heat exchanger 400 and cools the air passing through the heat exchanger 400.

The expansion valve 410 changes the opening of the valve according to the pressure and temperature of the refrigerant returning toward the compressor 20 from the evaporator 40, to thereby control the flow rate of the refrigerant being sent to the evaporator.

The blower device 60 has two fans mounted on both ends of a shaft of a motor, and blows air toward the condenser 30 and also blows the cooled air generated in the air cooling chamber toward the service carts placed in the passenger cabin.

Figure 3:
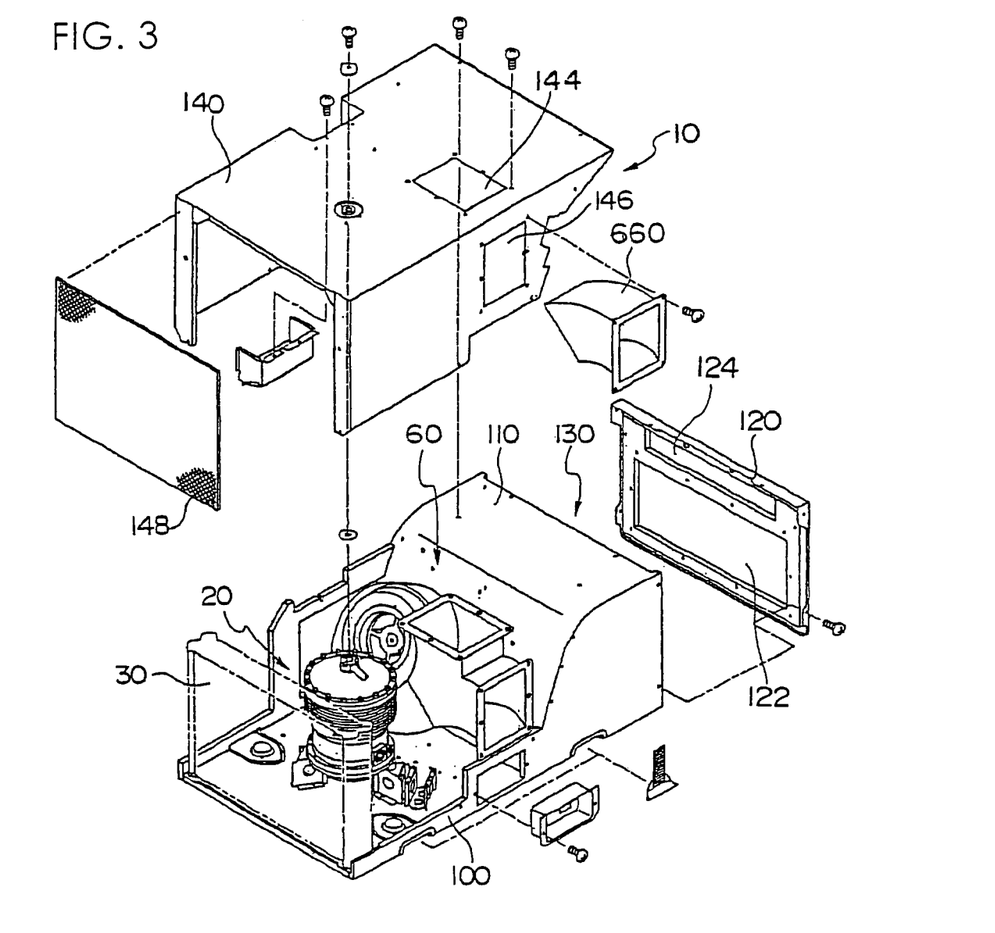
FIG. 3 is an explanatory view showing the structure of a casing of the air chiller unit according to the present invention.
Figure 4:
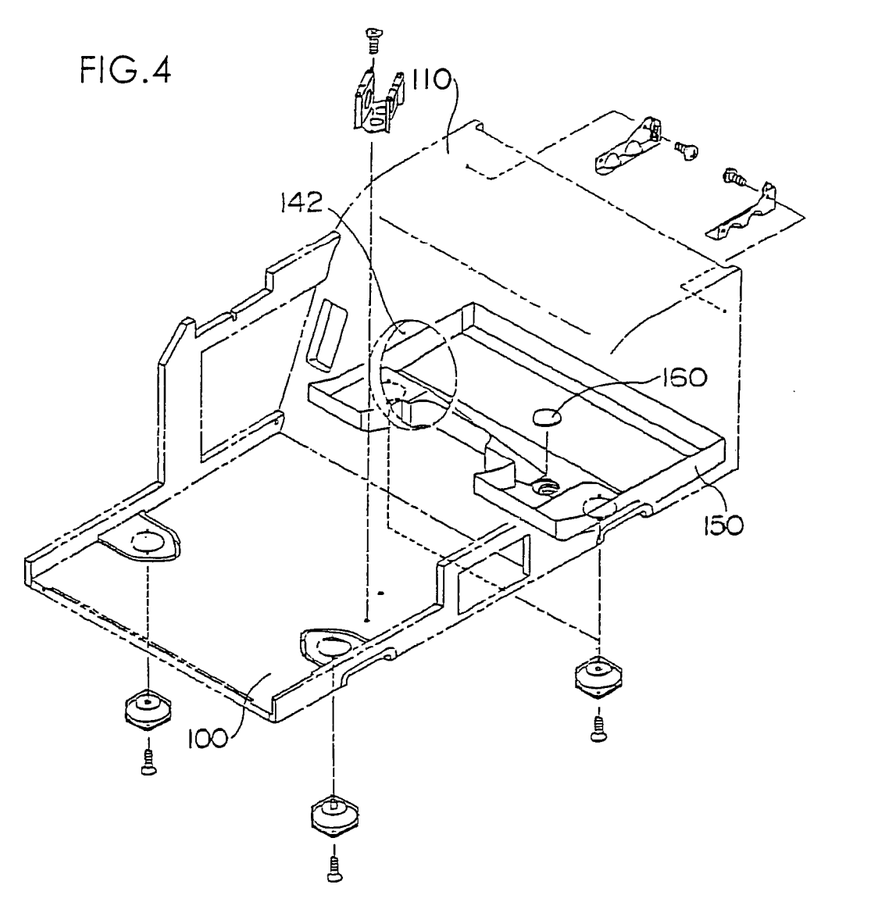
FIG. 4 is an explanatory view showing the structure of a casing of the air chiller unit according to the present invention.

FIGS. 3 and 4 are explanatory views showing the structure of a casing of the air chiller unit according to the present invention.

The casing 10 comprises a base plate 100, and on the base plate 100 are mounted devices such as the compressor 20.

The base plate 100 is formed of a honeycomb panel manufactured by sandwiching a core member having a honeycomb structure between two parallel plate members.

The honeycomb panel is light weight and has superior flexural rigidity, so the base plate 100 is capable of supporting devices such as the compressor 20 by itself.

Since the honeycomb panel is formed to have air sealed in the honeycomb core, it has high heat insulating property. Therefore, it is suitable for forming the air cooling chamber or the like.

A partition member 110 formed of a honeycomb panel is disposed on the base plate 100. This partition member 110 is for dividing the air chiller unit into a side having the condenser and a side having the evaporator, and on this partition member 110 is mounted the blower device 60.

The partition member constitutes a portion of the air cooling chamber 130. A lid member 120 is mounted on the opening of the partition member 110.

The lid member 120 connected to a duct device 5 is equipped with a first opening 122 and a second opening 124. The first opening 122 is connected to a passage for sending the cool air returning from the galley to the air cooling chamber 130, and the second opening 124 is connected to a passage for sending the freshly cooled air cooled in the air cooling chamber 130 toward the galley.

A cover member 140 is mounted above the base plate 100, by which the compressor 20 and the blower device 60 are covered. The cover member 140 has rectangular openings 144 and 146 on the upper surface and side surface thereof. These openings 144 and 146 are for the condenser-side air duct to be attached thereto, and only one of the two openings is to be used.

A mesh member 148 is attached to the end of the cover member 140, by which the front face of the condenser 30 is covered.

As illustrated in FIG. 4, a round hole 142 for the blower device is provided to the partition member 110. Further, a drain pan 150 for receiving dew drops condensed on the evaporator is attached to the bottom of the air cooling chamber. The drain pan 150 is equipped with a drain valve 160.

Figure 5:
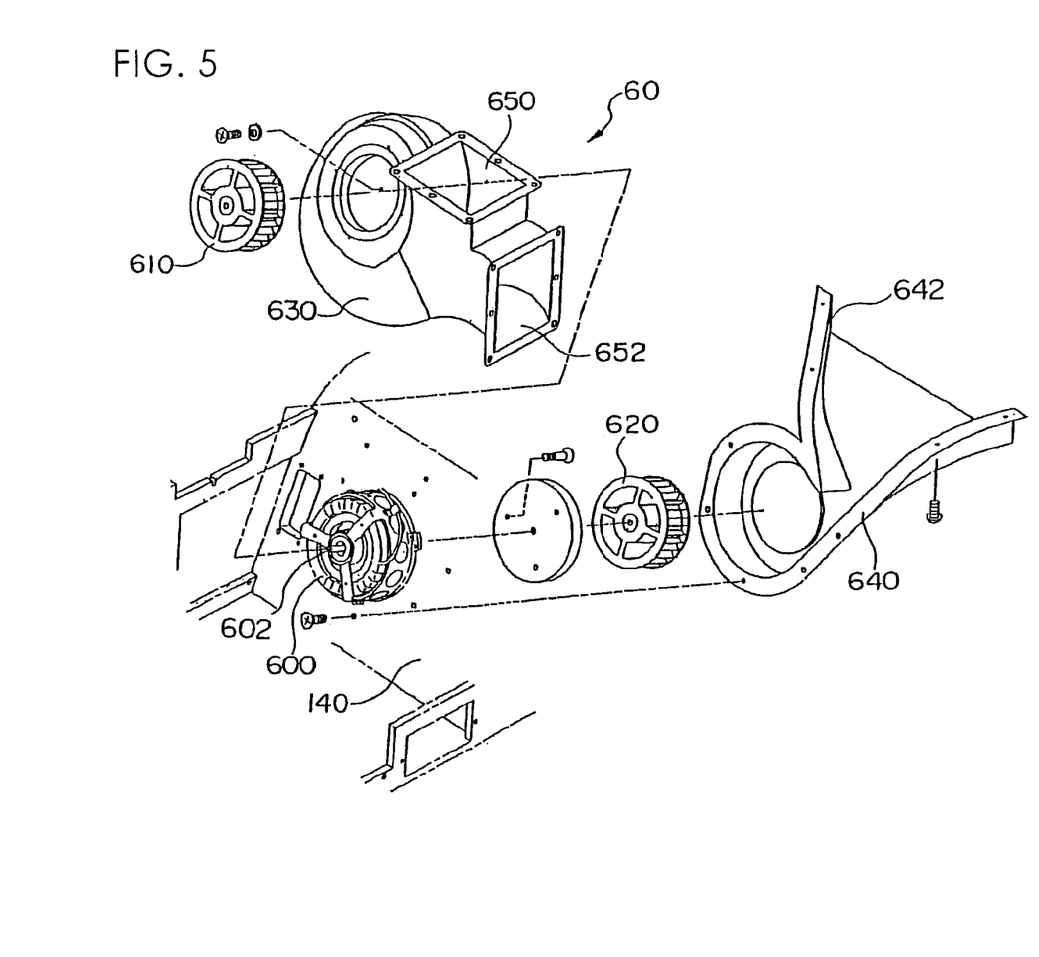
FIG. 5 is an explanatory view of a blower device of the air chiller unit according to the present invention.

FIG. 5 is an explanatory view showing the structure of the blower device 60.

The blower device 60 has a housing 630 constituting a passage for sending out cooled air, and a motor 600 disposed within the housing 630. The motor 600 has a drive shaft 602 whose both ends protrude therefrom, and on both ends of the driving shaft are fixed a first fan 610 and a second fan 620.

The first fan 610 is for sending the air for cooling the side having the condenser 30. The second fan 620 is for blowing the air cooled in the air cooling chamber toward the galley. The round hole 142 for the blower device formed to the partition member 110 is covered with a cover 640.

An opening portion 642 of the cover 640 is connected to the second opening 124 of the lid member 120 for sending the freshly cooled air toward the galley.

Figure 6:
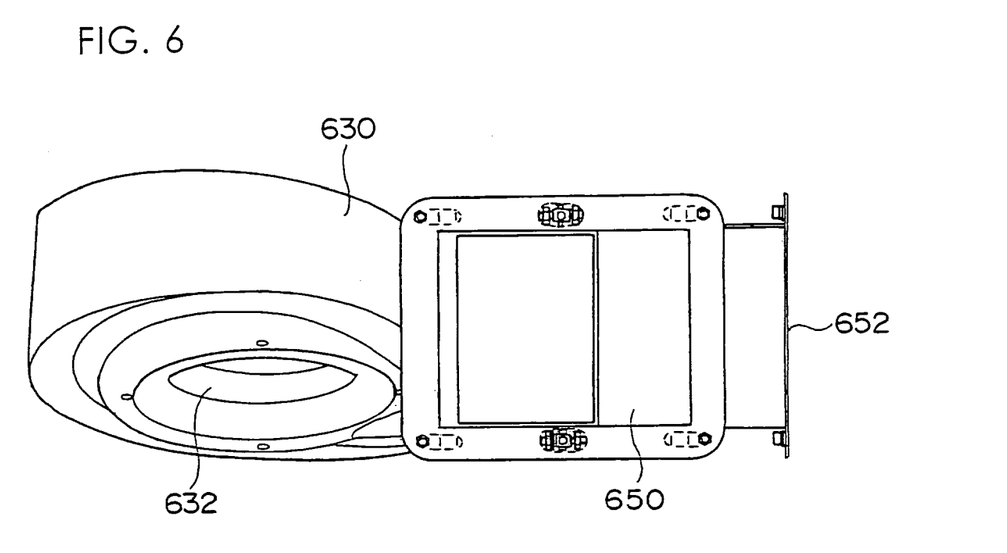
FIG. 6 is a front view of a housing of the blower device.
Figure 7:
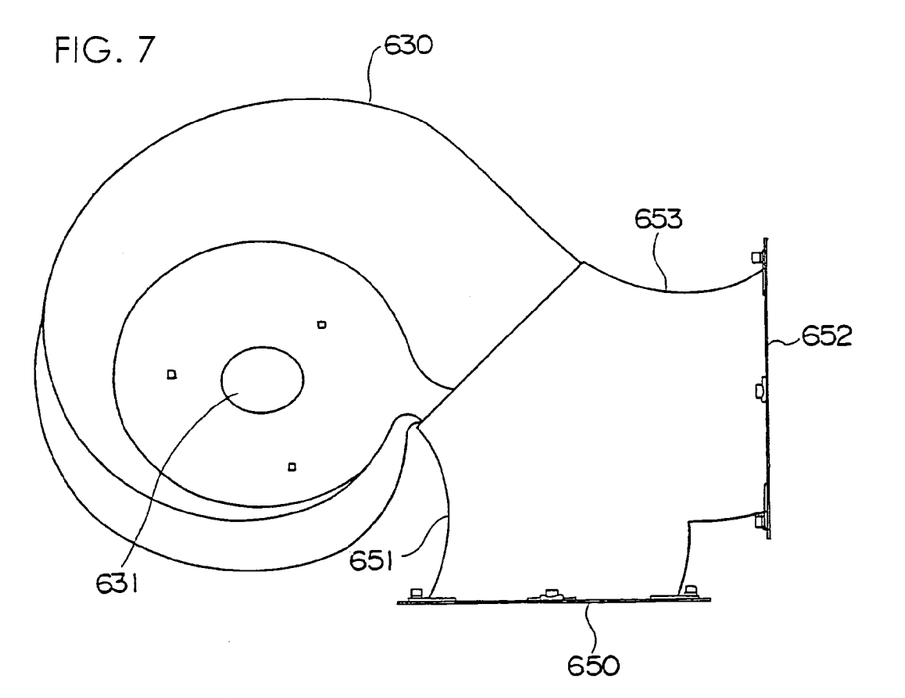
FIG. 7 is an upper view of FIG. 6.
Figure 8:
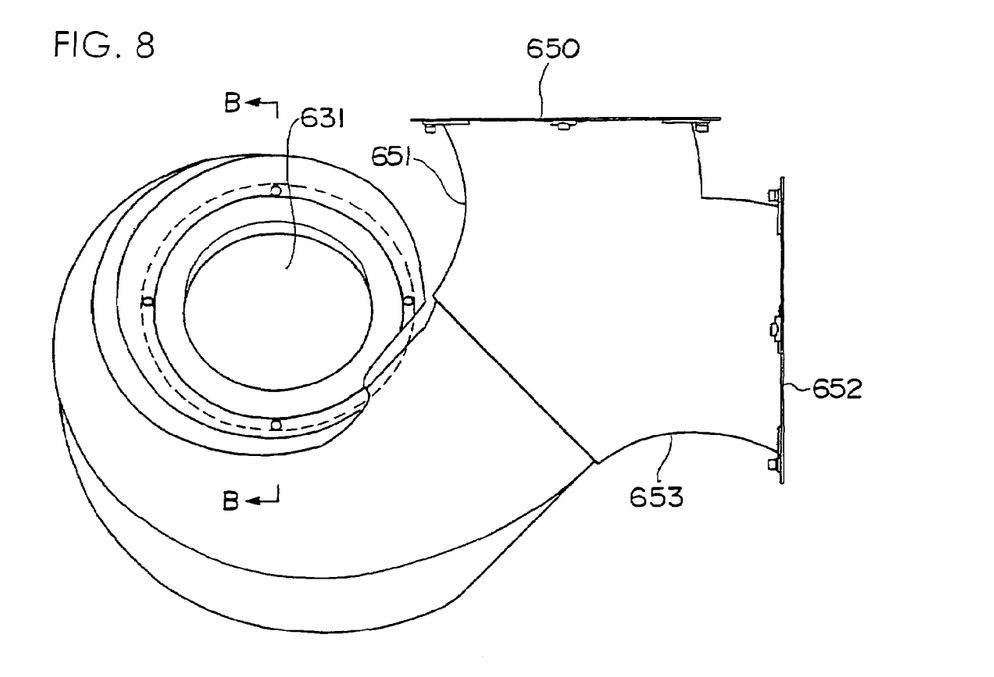
FIG. 8 is a bottom view of FIG. 6.
Figure 9:
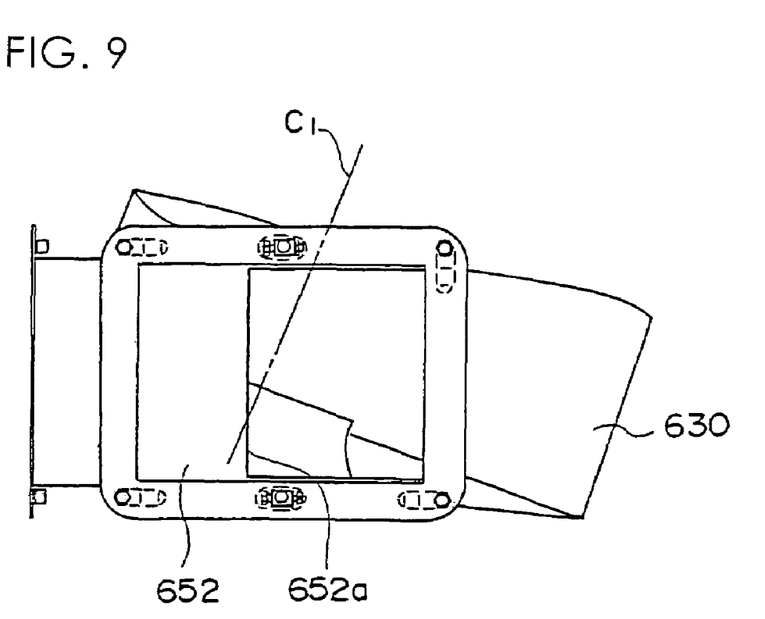
FIG. 9 is a right side view of FIG. 6.
Figure 10:
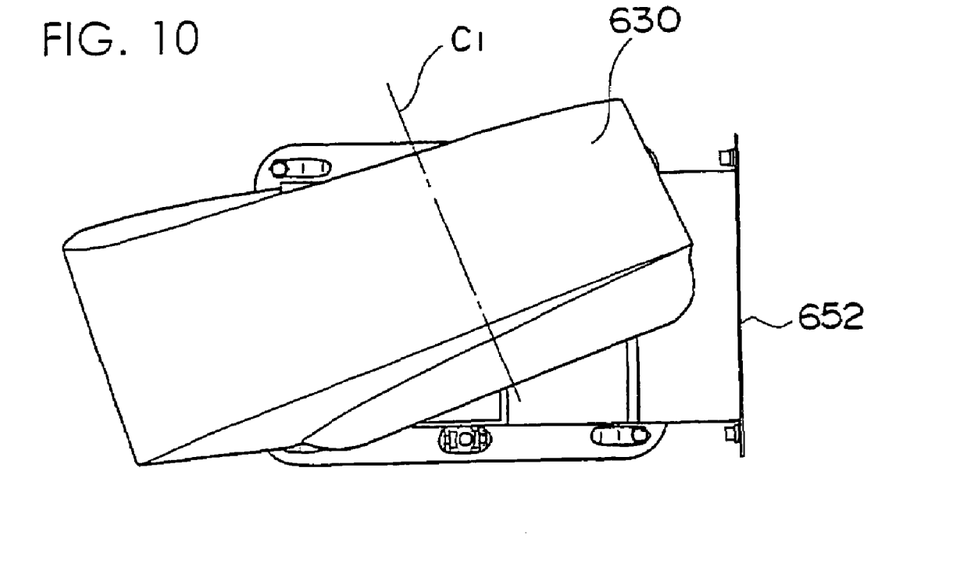
FIG. 10 is a left side view of FIG. 6.
Figure 11:
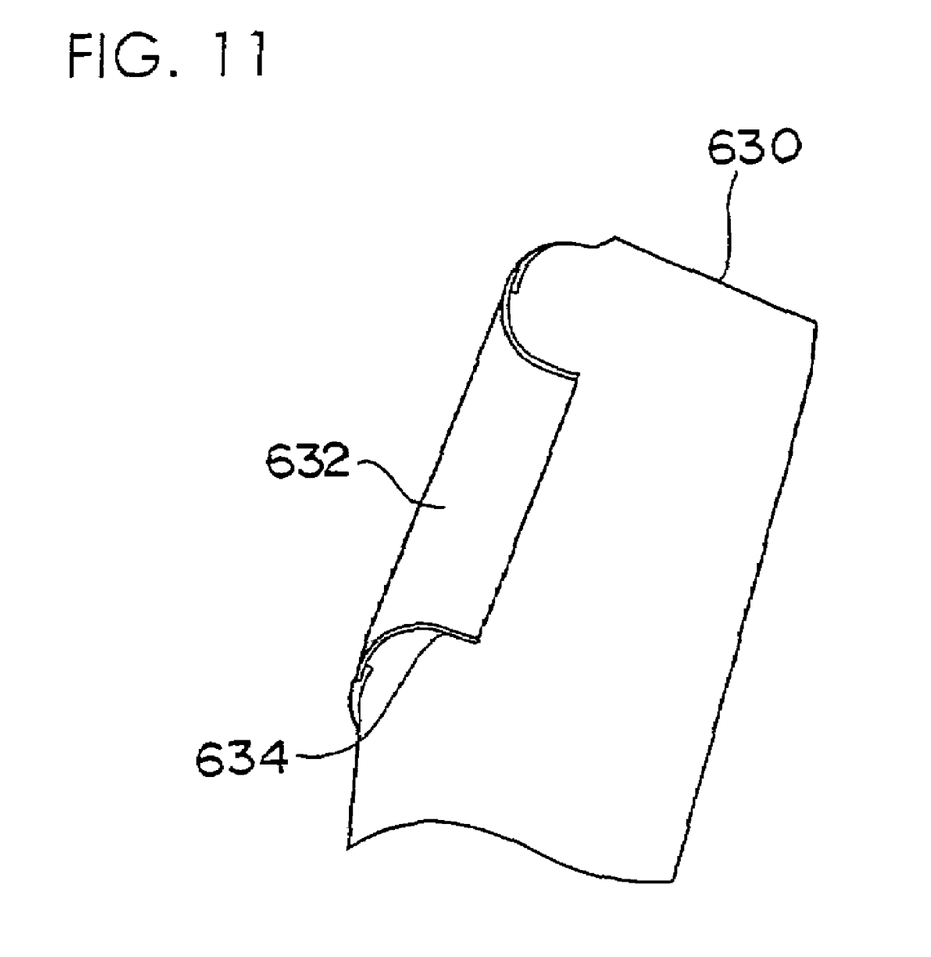
FIG. 11 is a B-B cross section of FIG. 8.

FIG. 6 is a front view of a housing 630 of the blower device, FIG. 7 is an upper view of FIG. 6, FIG. 8 is a bottom view of FIG. 6, FIG. 9 is a right side view of FIG. 6, FIG. 10 is a left side view of FIG. 6, and FIG. 11 is a B-B cross-section of FIG. 8.

The housing 630 comprises an air inlet 632 for cool air, and two air outlets 650 and 652. The outlets 650 and 652 are rectangular, and have identical sizes.

The two outlets 650 and 652 are disposed at an angle of 90 degrees from each other, and according to the installation layout of the air chiller unit, only one of the outlets is used, and the other outlet is sealed.

A pass-through opening 631 is formed coaxially with the inlet 632 for the output shaft of the motor.

As illustrated in FIGS. 9 and 10, the rotation axis $C_1$ is tilted with respect to the central axis of the outlet for blowing air. This tilt causes the cool air sucked into the housing 630 through the inlet to flow along the inner side of the housing 630 toward the outlet, by which the noise being generated can be reduced effectively.

Moreover, as illustrated in FIG. 11, since the surrounding wall 634 of the inlet 632 is bent in a horn-like shape, the flow of air being taken in becomes smooth, and the suction noise is cut down.

Figure 12A:
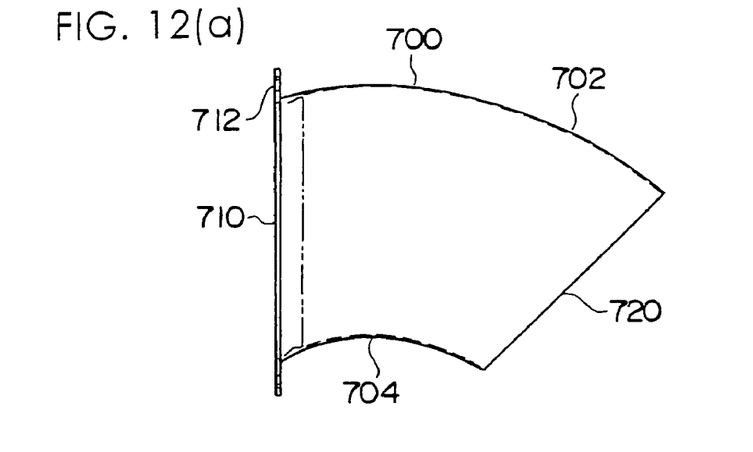
FIG. 12 is a structural diagram of a duct member.
Figure 12B:
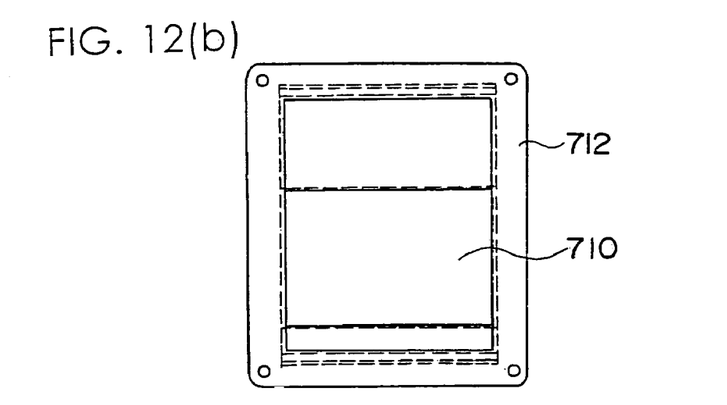
Figure 12C:
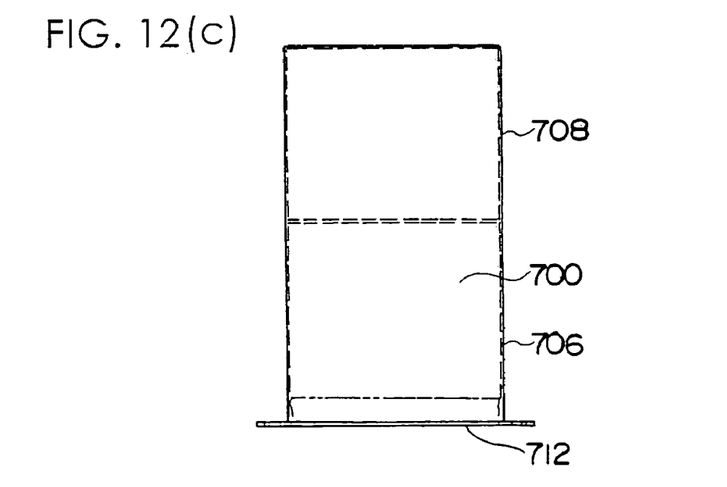

FIG. 12 illustrate the structure of a duct member inserted to the outlet of the housing, wherein (a) is the front view, (b) is the left side view, and (c) is the upper view of (b).

The duct member 700 is formed by molding plastic or the like, having a curved body portion, an opening 710 with a flange portion 712 and an opening 720 opposite therefrom, which are connected via parallel side walls 706 and 708, a long curved wall 702 and a short curved wall 704.

The duct member 700 can be inserted to either the first outlet 650 or the second outlet 652 of the housing 630. In other words, as illustrated in FIGS. 7 and 8, the first outlet 650 is connected to the curved portion 651, and the second outlet 652 is connected to the curved portion 653.

Therefore, the passage for cooled air can be formed by inserting to the housing outlet the duct member 700 with the short curved wall 704 disposed along the inner side of the curved portions 651 and 653 of the housing.

Cooling air can flow smoothly from the inlet to the outlet through this passage, and the generation of noise can be cut down.

Figure 13A:
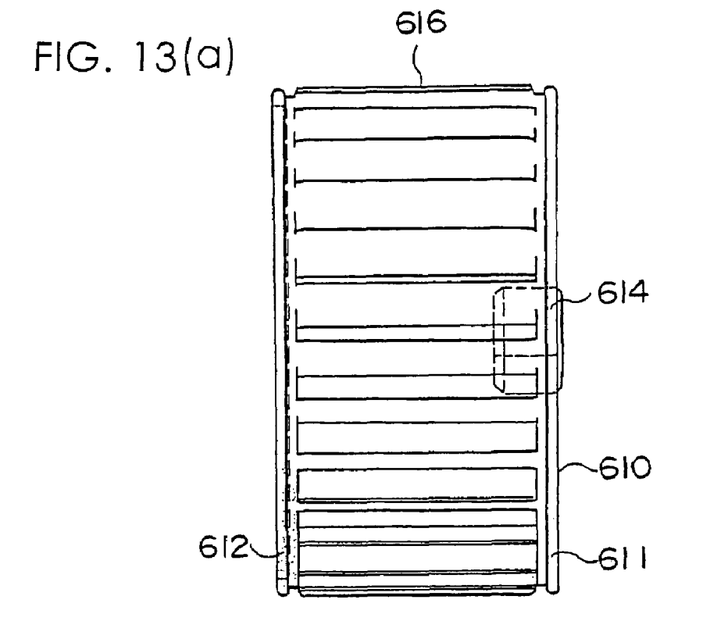
FIG. 13 is a structural diagram of an impeller.
Figure 13B:
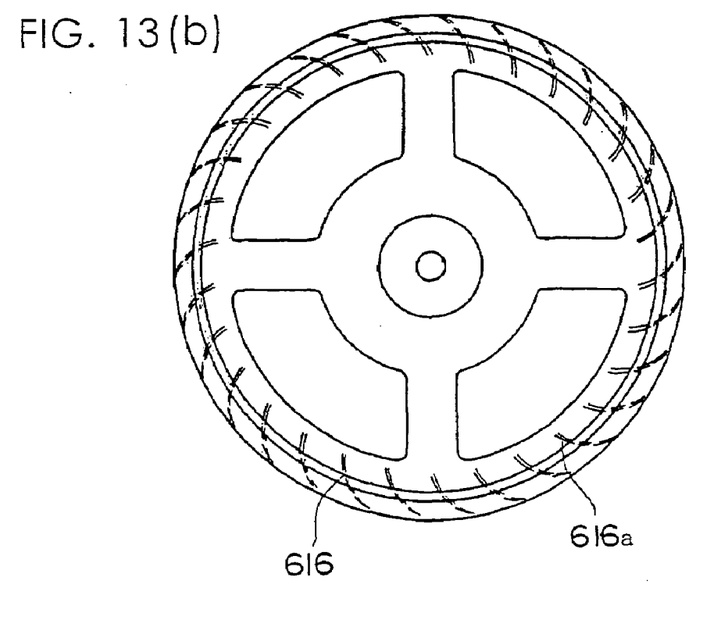

FIG. 13 is an explanatory view showing the structure of the impeller equipped to the blower device. The impeller is a centrifugal fan having a so-called sirocco fan structure, in which an impeller blade 616 is disposed between a round plate 611 and a ring 612, and is mounted on the output shaft of a motor via a boss 614.

When the impeller 610 rotates, the impeller blade 616 provides centrifugal force to the cooled air, and creates an air current flowing from the center of the impeller toward the outer side thereof. Since the rotation axis of the impeller is tilted, the impeller blade 616 is designed to sequentially contact the housing 652a with respect to the cooled air, and thus the impact is reduced.

According to this operation, the wind noise of the impeller blade is cut down.

Moreover, by providing a noise reduction layer 616a on the surface of the blade 616, the wind noise can be cut down even further.

What is claimed is:

1. An air chiller unit mounted on an aircraft for supplying cooled air to a storage portion for storing food and the like, the air chiller unit comprising:
   a refrigeration cycle unit;
   a casing for storing the refrigeration cycle unit; and
   a blower device for blowing the cooled air, wherein a housing of the blower device comprises an air inlet, first and second outlets, and a duct member selectively inserted to the first and second outlets,
   wherein a rotation axis of an impeller disposed inside the air inlet is tilted with respect to the housing of the blower device, a surrounding wall of the air inlet is bent in a horn-like shape and a velvety layer is disposed on a surface of an impeller blade of the impeller.

* * * * *